US010788569B2

(12) United States Patent
Lin et al.

(10) Patent No.: US 10,788,569 B2
(45) Date of Patent: Sep. 29, 2020

(54) RECONFIGURABLE RADAR UNIT, INTEGRATED CIRCUIT AND METHOD THEREFOR

(71) Applicant: NXP B.V., Eindhoven (NL)

(72) Inventors: Yu Lin, Utrecht (NL); Maarten Lont, Eindhoven (NL)

(73) Assignee: NXP B.V., Eindhoven (NL)

( * ) Notice: Subject to any disclaimer, the term of this patent is extended or adjusted under 35 U.S.C. 154(b) by 305 days.

(21) Appl. No.: 15/907,501

(22) Filed: Feb. 28, 2018

(65) Prior Publication Data

US 2018/0267144 A1 Sep. 20, 2018

(30) Foreign Application Priority Data

Mar. 14, 2017 (EP) .................................... 17160924

(51) Int. Cl.
*G01S 7/40* (2006.01)
*G01S 13/931* (2020.01)
(Continued)

(52) U.S. Cl.
CPC ............ *G01S 7/4021* (2013.01); *G01S 7/023* (2013.01); *G01S 7/032* (2013.01); *G01S 7/285* (2013.01);
(Continued)

(58) Field of Classification Search
CPC ........ G01S 7/4021; G01S 7/023; G01S 7/032; G01S 7/285; G01S 7/352; G01S 7/42;
(Continued)

(56) References Cited

U.S. PATENT DOCUMENTS 3,688,313 A * 8/1972 Kern ....................... G01S 13/66
342/97
5,717,399 A * 2/1998 Urabe .................. H01Q 1/3233
342/70
(Continued)

FOREIGN PATENT DOCUMENTS

EP          2927706 A1    10/2015
WO     2008001092 A3     1/2008
WO     2015184406 A1    12/2015

OTHER PUBLICATIONS

Guermandi, D., "A 79GHz Binary Phase-Modulated Continuous-Wave Radar Transceiver with TX-to-RX Spillover Cancellation in 28nm CMOS", ISSCC 2015, Session 19, Advanced Wireless Techniques, IEEE International Solid-State Circuits Conference, 2015.

(Continued)

*Primary Examiner* — Peter M Bythrow

(57) ABSTRACT

A reconfigurable radar unit is described that includes: a millimetre wave (mmW) transceiver (Tx/Rx) circuit; a mixed analog and baseband integrated circuit; and a signal processor circuit. The mmW Tx/Rx circuit and mixed analog and baseband integrated circuit and signal processor circuit are configured to support a plurality of radar operational modes. a radar sensitivity monitor and architecture reconfiguration control unit (260) is coupled to the signal processor circuit and is configured to monitor a radar performance and, in response thereto, initiate a change in the radar operational mode. In this manner, a large number of radar operational modes is supported and can be dynamically adopted by the reconfigurable radar unit dependent upon any prevailing radar performance condition.

20 Claims, 8 Drawing Sheets

(51) Int. Cl.
| | |
|---|---|
| *G01S 13/32* | (2006.01) |
| *G01S 13/10* | (2006.01) |
| *G01S 13/34* | (2006.01) |
| *G01S 7/02* | (2006.01) |
| *G01S 13/87* | (2006.01) |
| *G01S 7/42* | (2006.01) |
| *G01S 7/03* | (2006.01) |
| *G01S 7/285* | (2006.01) |
| *G01S 7/35* | (2006.01) |
| *G01S 13/86* | (2006.01) |
| *G01S 13/02* | (2006.01) |

(52) U.S. Cl.
CPC ............. *G01S 7/352* (2013.01); *G01S 7/42* (2013.01); *G01S 13/10* (2013.01); *G01S 13/325* (2013.01); *G01S 13/34* (2013.01); *G01S 13/346* (2013.01); *G01S 13/87* (2013.01); *G01S 13/931* (2013.01); *G01S 13/0209* (2013.01); *G01S 13/865* (2013.01); *G01S 13/867* (2013.01); *G01S 2007/358* (2013.01); *G01S 2013/0272* (2013.01)

(58) Field of Classification Search
CPC ...... G01S 13/325; G01S 13/34; G01S 13/346; G01S 13/87; G01S 13/931; G01S 13/0209; G01S 13/865; G01S 13/867; G01S 2013/0272; G01S 2007/358
See application file for complete search history.

(56) References Cited

U.S. PATENT DOCUMENTS

| | | | | |
|---|---|---|---|---|
| 6,081,226 | A * | 6/2000 | Caldwell | G01S 7/282 342/200 |
| 7,148,840 | B2 * | 12/2006 | Dooi | G01S 13/931 342/131 |
| 7,492,313 | B1 | 2/2009 | Ehret et al. | |
| 7,573,420 | B2 * | 8/2009 | Forstner | G01S 7/032 342/175 |
| 8,717,224 | B2 * | 5/2014 | Jeong | G01S 13/931 342/70 |
| 9,000,974 | B2 * | 4/2015 | Vacanti | G01S 13/937 342/175 |
| 9,194,946 | B1 * | 11/2015 | Vacanti | G01S 13/32 |
| 9,229,102 | B1 * | 1/2016 | Wright | G01S 13/888 |
| 2007/0152869 | A1 * | 7/2007 | Woodington | G01S 13/48 342/70 |
| 2008/0258964 | A1 * | 10/2008 | Schoeberl | G01S 13/44 342/189 |
| 2008/0278370 | A1 * | 11/2008 | Lachner | G01S 7/03 342/200 |
| 2009/0201194 | A1 * | 8/2009 | Winkler | G01S 7/35 342/146 |
| 2013/0069818 | A1 * | 3/2013 | Shirakawa | G01S 13/347 342/146 |
| 2015/0285897 | A1 * | 10/2015 | Kilty | G01S 7/02 342/195 |

OTHER PUBLICATIONS

Im, Y., "A Pulse-Doppler and FMCW Radar Signal Processor for Surveillance", Synthetic Aperture Radar (APSAR), 2011 3rd International Asia-Pacific Conference.
Jain, V., "A Single-Chip Dual-Band 22-29-GHz/77-81-GHz BiCMOS Transceiver for Automotive Radars", IEEE Journal of Solid-State Circuits, vol. 44. No. 12, Dec. 2009.
Jeong, S., "A Multi-Beam and Multi-Range Radar with FMCW and Digital Beam Forming for Automotive Applications", Progress in Electromagnetics Research, vol. 124, 285-299, 2012.
Kawano, Y., "RF Chipset for Impulse UWB Radar Using 0.13-m InP-HEMT Technology", IEEE Transactions on Microwave Theory and Techniques, vol. 54, No. 12, Dec. 2006.
Kim, C., "A CMOS Centric 77GHz Automotive Radar Architecture", IEEE Radio Frequency Integrated Circuits Symposium, 2012.
Lee, J., "A Fully-Integrated 77-GHz FMCW Radar Transceiver in 65-nm CMOS Technology", IEEE journal of Solid-State Circuits, vol. 45, No. 12, Dec. 2010.
Saddik, G., "Ultra-Wideband Multifunctional Communications/Radar System", IEEE Transactions on Microwave Theory and Techniques, vol. 55, No. 7, Jul. 2007.

* cited by examiner

US 10,788,569 B2

RECONFIGURABLE RADAR UNIT, INTEGRATED CIRCUIT AND METHOD THEREFOR

CROSS-REFERENCE TO RELATED APPLICATIONS

This application claims the priority under 35 U.S.C. § 119 of European Patent application no. 17160924.1, filed on 14 Mar. 2017, the contents of which are incorporated by reference herein.

FIELD OF THE INVENTION

The field of the invention relates to a re-configurable architecture for a millimetre wave (mmW) radar unit. The invention is applicable to, but not limited to, a dynamically selectable 76-81 GHz mmW radio frequency (RF) architecture from multiple possible supported architectures, dependent upon the prevailing operational conditions of the radar unit.

BACKGROUND OF THE INVENTION

There has been an increased demand for active safety systems for vehicles, Active safety systems require multiple radar sensors per vehicle, each typically working with a specific radar technology. Currently, there are a handful of radar sensor technologies adopted and installed by leading module vehicle manufacturers. Each of these differ in terms of operational principles and typically each radar sensor architecture (and associated radar technology) is supported by a dedicated integrated circuit (IC) set. The frequency band of 76-81 GHz has been allocated for such radar operation, with 76-77 GHz dedicated for long-range operation and 77-81 for mid-range and short-range automotive radar operation. The most popular architecture supports the transmission, reception and processing of frequency modulated continuous wave (FMCW) radar signals. In addition, other known architectures and IC sets support the transmission, reception and processing of phase modulated continuous wave (PMCW) radar signals or frequency shift keyed (FSK) radar signals or pulse Doppler radar signals or ultra-wideband (UWB) impulse radar signals. Radar sensors employing different radar technologies provide alternative benefits, for example in order to collect the range, velocity and angle information of objects for all parts of the vehicle safety system to function correctly. As each architecture has its respective advantages and disadvantages, most implementations have a particular preference for an active safety system that supports a certain radar signal, and hence a number of alternative radar technologies coexist in the marketplace.

A known FMCW radar unit can be realized in one integrated circuit (IC), for example using a complementary metal-oxide-semiconductor (CMOS) technology, or multiple separate ICs, for example using a Silicon Germanium (SiGe) technology. Referring now to FIG. 1, a block diagram illustrates a further known FMCW radar unit 100. The FMCW radar unit 100 includes one or more transmitter antenna(e) 110 and one or more receiver antenna(e) 112 and transceiver and signal processing circuits. The radar functions with multiple separate ICs include, e.g., a mmW transceiver (TxRx) circuit 120, an analog/mixed signal baseband circuit 140 and a microprocessor IC 150. In a transmitter sense, the microprocessor IC 150 includes a digital control and signal processing unit 152 that provides a transmit radar signal 154 to a frequency chirp generator circuit that includes a waveform generator 142 in the analog/mixed signal baseband circuit 140. The waveform generator 142 provides a signal 138 that is to be modulated to a voltage controlled oscillator (VCO) circuit 126. The modulated signal is then optionally passed to a frequency multiplier 124 (if the VCO generated signal is not at the operating frequency of the FMCW radar sensor 100). The high-frequency output 132 of the VCO 126 or the frequency multiplier 124 is passed to a power amplifier 122, where it is amplified and routed to the one or more transmitter antenna(e) 110.

A radar signal is received at the one or more receiver antenna(e) 112 and passed to a low nose amplifier (LNA) 128 where it is amplified. The amplified received radar signal is passed to a down-mixer 130, where it is mixed with the high-frequency signal 132 output from the VCO 126. The down-converted received radar signal 134 from down-mixer 130 is input to a programmable baseband circuit 144 that includes a bandpass filter and one or more gain amplifiers, as well as an analog-to-digital converter (ADC). The digital output 156 from the programmable baseband circuit 144 is input to the digital control and signal processing unit 152 for processing and the received processed radar signal 158 is output.

Most of the automotive radar sensors in the market nowadays are built with chip sets from one or multiple different IC design companies (for example with standalone receiver, transmitter, PLL, baseband, and microprocessor ICs). There are two notable observations on this situation. First, commercial solutions disclosed by vehicle manufacturers at this moment are mainly based on a certain dedicated operation principle with very limited reconfigurable features. In particular, the inventors of the present invention have identified that a significant cost, not yet seen in commercial products, is the potential for re-configurability among different operation principles, e.g. from FMCW to PMCW to pulse . . . , as such re-configurability involves including additional/redundant hardware in order to realize it. Secondly, general purpose radar system platforms demonstrated by manufacturers are mostly built with off-the-shelf general purpose components. Such a solution relies on high performance data converters in order to achieve the re-configurability, and these are very power hungry (typically a few watts). Furthermore, this solution is limited by the linearity performance of current state-of-art data converters, and thus can only achieve sub-optimal performance when covering multiple operation principles. Alternatively, the high performance data converters that could be used to provide reconfigurability are currently not available to cover all stringent radar system requirements (e.g. unable to meet a spurious-free dynamic range (SFDR)>90 dBFS, bandwidth>1 GHz), and are typically also expensive components.

U.S. Pat. No. 9,000,974-B2 from D. C. Vacanti describes a method of combining two transmitters/receivers with different but similar operational principles (FMCW and pulse) in a monostatic radar system (where the antenna is shared by both transmitter and receiver through a circulator). In this system, two transmitters (FMCW and Pulse), each include their own respective RF/mmW circuits, but share the same frequency synthesizer through a hybrid coupler. Their output is combined through a directional coupler to the antenna. In the receiving path, two receivers, having different baseband circuits, share the same RF/mmW front-end circuits (i.e. LNA and mixer) through a switch, with their respective outputs passed to a shared signal processing unit (DSP). Notably, the inventors of U.S. Pat. No. 9,000,974-B2 did not contemplate combining RF TxRx functions across multiple and dissimilar radar technologies.

U.S. Pat. Nos. 7,148,840-B2 and 3,688,313-B1 both describe architectures that are able to combine a maximum of two similar radar techniques, namely again a FMCW radar with a pulse radar, in order to support both long-range and short-range target tracking in a single radar unit.

A non-dedicated, flexible radar architecture is desirable that supports a wider range of radar techniques, at an acceptable performance level and cost.

SUMMARY OF THE INVENTION

The present invention provides a radar unit, integrated circuit and method of operation with a new radar architecture that supports multiple radar operational modes, a mmW Tx/Rx integrated circuit, an analog/mixed signal baseband circuit and a method for selecting a radar operational mode from a plurality of radar operational modes, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
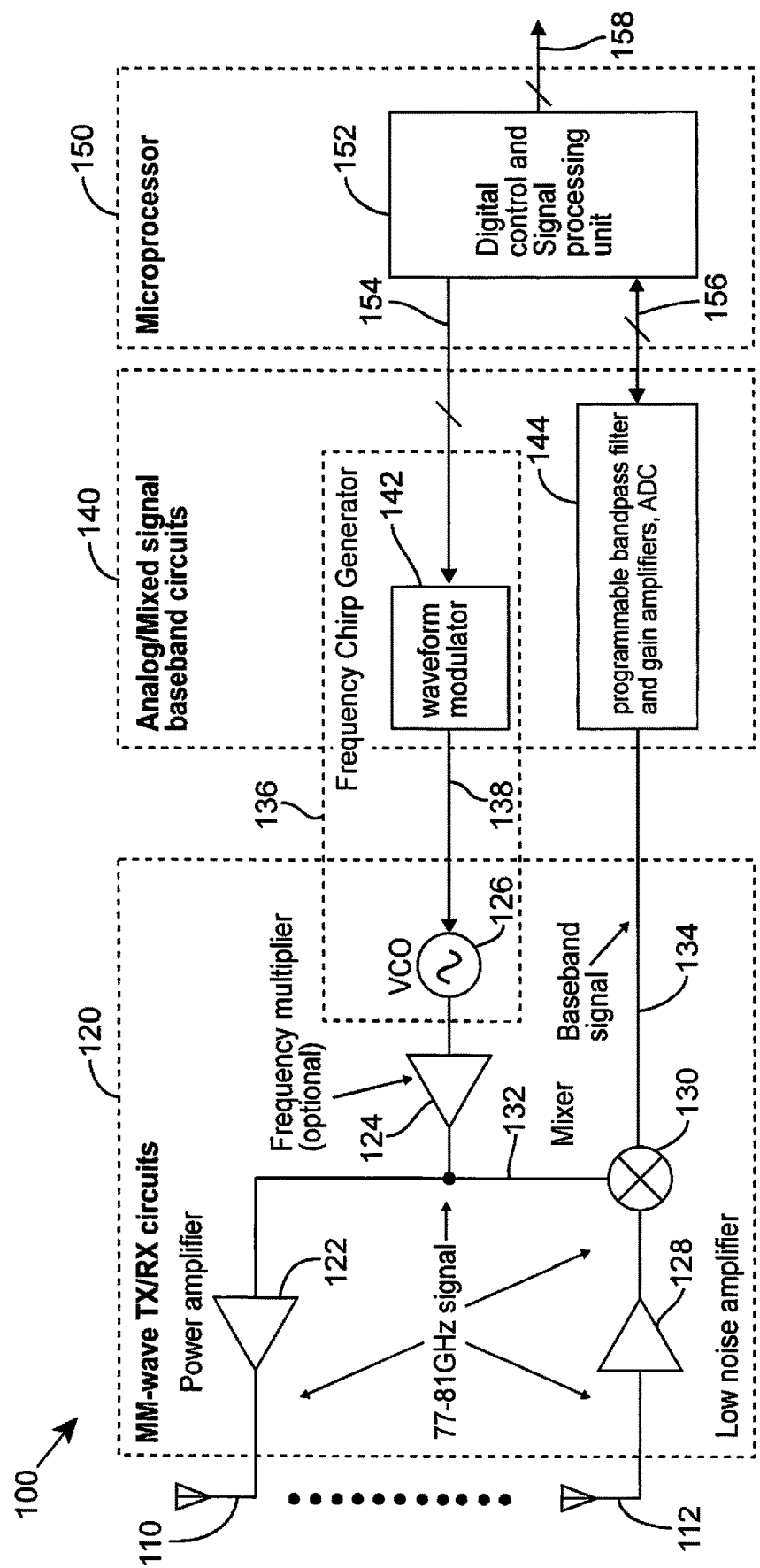
FIG. 1 illustrates a block diagram of a known frequency modulated continuous wave (FMCW) radar unit.

The inventors of the present invention have recognized and appreciated that it would be advantageous to develop a radar architecture/radar unit design that supports multiple selectable radar technologies and that is able to switch between the multiple selectable radar technologies in a real-time manner. Examples of the invention are described with reference to a reconfigurable radar unit that includes a radar sensitivity monitor and architecture reconfiguration control unit and is capable of switching between a plurality of radar operational modes in a real-time manner. Although examples of the invention are described with reference to a three integrated circuit radar solution, namely a mmW TX/RX circuit, a mixed analog and baseband integrated circuit and a signal processing integrated circuit, it is envisaged that the concepts herein described, whereby more than two radar operational modes are supported, may be implemented in a single chip transceiver. In alternative examples of the invention, a single chip transceiver solution is capable of supporting two or more radar operational modes, with a low power and a cost effective radar hardware platform. In some examples, a signal processing IC is located on the single chip to enable re-configurability amongst the different, multiple operational modes to serve a wide range of radar applications. Although examples of the invention are described with reference to a three integrated circuit radar solution, namely a mmW TX/RX circuit, a mixed analog and baseband integrated circuit and a signal processing integrated circuit, it is envisaged that the concepts herein described may be implemented in a single integrated circuit radar solution, where the all three functions may be located in one integrated circuit.

In examples of the invention, the reconfigurable radar unit that includes a radar sensitivity monitor and architecture reconfiguration control unit and is capable of switching between a plurality of operational modes in a real-time manner is able to support each of the popular radar operation principles, such as FMCW, PMCW, FSK, UWB impulse radar and quadrature radar signal processing. In some examples of the invention, a cost effective and low power radar hardware platform may be provided, using a highly-integrated automotive radar RFCMOS IC that is reconfigurable by, say, software to operate in the various operational modes. In this manner, recent advances in CMOS fabrication process technology enable the CMOS transistors to have a performance that approaches other high-speed technologies (such as SiGe and GaAs), whereby the cost and yield of manufacturing CMOS ICs at larger volumes is much lower. Furthermore, adapting CMOS allows integration of the mmW/RF transceiver and baseband circuits with the digital signal processor, which provides an increase of processing power due to the advances in CMOS processes, which have previously only been available in other technologies. Thus, the increase in processing power may be able to provide a higher level of re-configurability and support performance monitor functions.

In examples of the invention, the reconfigurable radar unit includes a radar sensitivity monitor and architecture reconfiguration control unit coupled to the signal processing circuit, and in some examples coupled to the single reconfigurable mmW Tx/Rx circuit, which is able overcome the limitations of known radar architectures by switching between radar operational modes in a real-time manner. In some examples, the switching between radar operational modes in a real-time manner may be performed in response to determining a status of the prevalent radar performance, as sensed by the radar sensitivity monitor and architecture reconfiguration control unit. In some examples, the reconfigurable radar unit includes a single reconfigurable mmW Tx/Rx circuit that is capable of supporting multiple radar signal types efficiently thereby reusing the same hardware circuits and components across multiple radar signal types. In this manner, a reconfigurable radar unit may be constructed with low design complexity and low power consumption.

A first aspect of the invention describes a reconfigurable radar unit that includes: a millimetre wave (mmW) transceiver (Tx/Rx) circuit; a mixed analog and baseband integrated circuit; and a signal processor circuit. The mmW Tx/Rx circuit and mixed analog and baseband integrated circuit and signal processor circuit are configured to support a plurality of radar operational modes. A radar sensitivity monitor and architecture reconfiguration control unit is coupled to the signal processor circuit and is configured to monitor a radar performance and, in response thereto, initiate a change in the radar operational mode. In this manner, a large number of radar operational modes is supported and can be dynamically adopted by the reconfigurable radar unit, dependent upon any prevailing radar performance condition. Additionally, this re-configurable architecture, and particularly the selection and combination of various functions and circuits, provides a cost effective, hardware-implementation solution.

In some examples, the radar sensitivity monitor and architecture reconfiguration control unit is configured to initiate a switch between two radar operational modes in a real-time manner. In this manner, the reconfigurable radar unit may be able to dynamically switch between any of a number of radar operational modes dependent upon any prevailing (e.g. rapidly changing) radar performance condition.

In some examples, the plurality of radar operational modes may include more than two radar operational modes, for example two or more than two from a group of: frequency modulated continuous wave (FMCW), pulse mode continuous wave (PMCW), frequency shift keyed (FSK), ultra-wideband (UWB) impulse radar, Pulse Doppler radar. In this manner, a larger number of radar operational modes may be supported than current known techniques. Furthermore, the supported radar operational modes may be a much wider variety (and dissimilarity) of radar technologies than known technologies.

In some examples, the mmW Tx/Rx circuit may be a single reconfigurable mmW Tx/Rx circuit configured to support multiple radar signal types. In this manner, for example for automotive radar applications, the mmW Tx/Rx circuit (and each component and circuit therein) may be configured as a highly integrated 77-81 GHz automotive radar using an RFCMOS IC, with hardware that is reconfigurable by software to operate in one of the various operational modes that are supported, for example reconfiguring a PA to work in a normal PA mode or a Dynamic Power-Supply Voltage mode or a switching mode (ASK).

In some examples, the reconfigurable radar unit may include one from a group of: a single chip transceiver that comprises the mmW Tx/Rx circuit, the mixed analog and baseband integrated circuit and the signal processing integrated circuit; a dual integrated circuit transceiver that comprises a mmW Tx/Rx integrated circuit and the mixed analog and baseband integrated circuit and wherein the signal processor is located on one of the two integrated circuits; a triple integrated circuit transceiver that comprises the mmW TX/RX circuit, the mixed analog and baseband integrated circuit and a distinct signal processing integrated circuit.

In a second aspect of the invention, an analog and mixed signal baseband integrated circuit for a reconfigurable radar unit is described. The analog and mixed signal baseband integrated circuit includes, in a transmit side, a plurality of radar signal generator circuits; and a multiplexer coupled to the plurality of radar signal generator circuits and configured to select a radar signal generated by one of the plurality of radar signal generator circuits for transmission by the reconfigurable radar unit. The analog and mixed signal baseband integrated circuit further includes, in a receive side, a plurality of radar baseband programmable circuits; and a demultiplexer coupled to the plurality of radar baseband programmable circuits and configured to select one of the plurality of radar baseband programmable circuits for processing a received radar signal based on the transmission by the reconfigurable radar unit. In some examples, the plurality of radar baseband programmable circuits may include a first selectable programmable circuit that includes at least one filter, at least one amplifier and at least one analog-to-digital converter configured for narrowband, high-linearity operation; and a second selectable programmable circuit that includes at least one filter, at least one amplifier and at least one analog-to-digital converter configured for wideband, low-linearity operation.

In a third aspect of the invention, a method of operation for a reconfigurable radar unit that comprises a millimetre wave (mmW) transceiver (Tx/Rx) circuit configured to radiate a transmit radar signal and receive an echo signal thereof; a mixed analog and baseband integrated circuit; and a signal processor circuit; such that the mmW Tx/Rx circuit and mixed analog and baseband integrated circuit and signal processor circuit. The method includes configuring at least the mixed analog and baseband integrated circuit and signal processor circuit to support a plurality of radar operational modes; monitoring a radar performance by a radar sensitivity monitor and architecture reconfiguration control unit; and dynamically re-configuring at least a portion of at least one of the mixed analog and baseband integrated circuit and signal processor circuit to effect a change in the radar operational mode in response to the monitored radar performance.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 2:
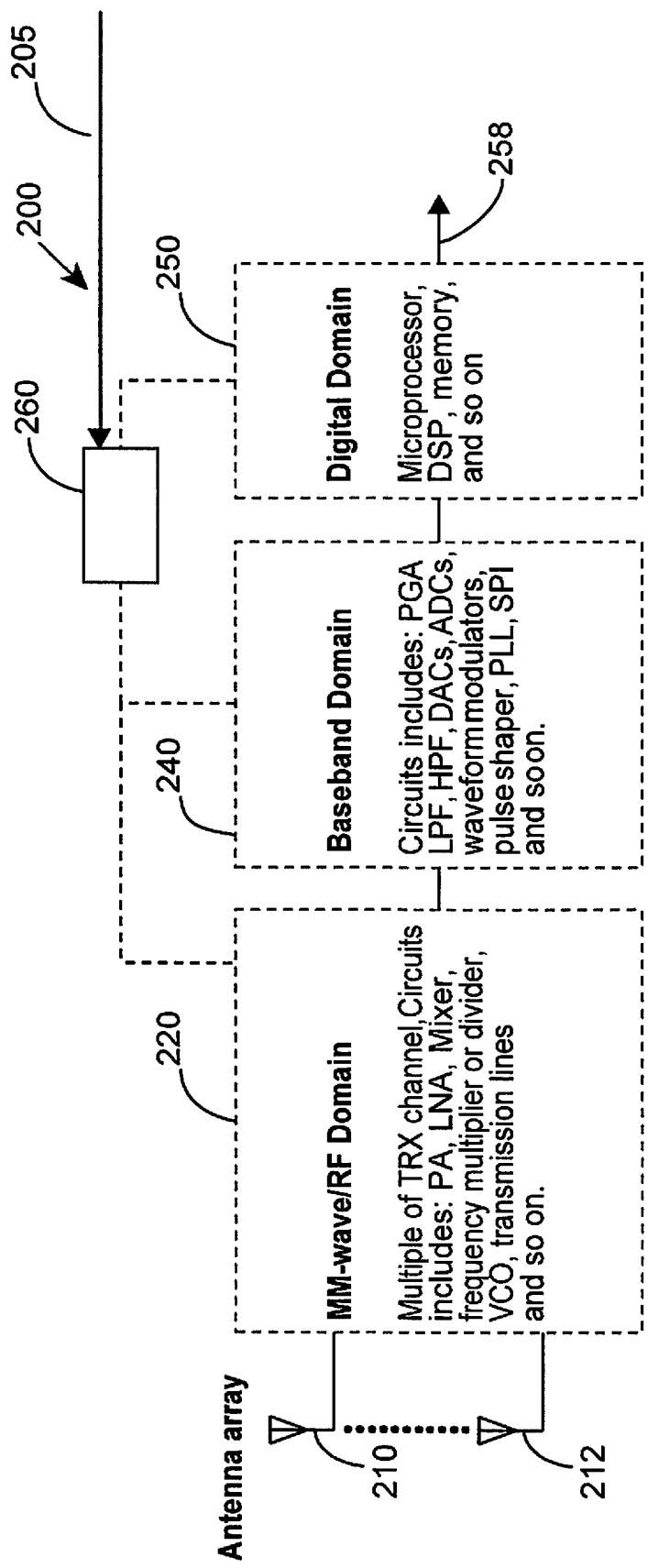
FIG. 2 illustrates an example overview block diagram of a reconfigurable radar unit with an IC architecture and a radar sensitivity monitor and architecture reconfiguration control unit, according to example embodiments of the invention.

Referring now to FIG. 2, an example overview block diagram of a reconfigurable radar unit 200 with an IC architecture and a radar sensitivity monitor and architecture reconfiguration control unit 260, according to example embodiments of the invention, is illustrated. The reconfigurable radar unit 200 includes a radar sensitivity monitor and architecture reconfiguration control unit 260 that receives a radar sensitivity monitor signal 205 and is operably coupled to at least one domain, of three domains in this example, of a 77 GHz automotive radar unit. The reconfigurable radar unit 200 includes one or more transmitter antenna(e) 210 and one or more receiver antenna(e) 212, partitioned into three domains, each supported by a respective IC, namely: a millimetre-wave (mmW)/RF IC (or domain) 220, a baseband and analog signal IC (or domain) 240, and a digital IC (or domain) 250. In this example, it is envisaged that the radar sensitivity monitor and architecture reconfiguration control unit 260 is operably coupled to digital IC (or domain) 250 and configured to monitor the prevalent radar performance. In other examples, as the radar sensitivity monitor and architecture reconfiguration control unit 260 is primarily implemented as digital circuits (in that it performs digital signal processing and generates control signals for reconfiguration of the mmWave/RF circuits and baseband circuits), it may be incorporated by other digital control and signal processing, e.g. digital IC 250.

In this example, it is envisaged that the prevalent radar performance that may be monitored may include, for example, an existence of any strong mutual interferences (often termed 'jamming') from other radar units operating in the same vicinity. If vehicles in the vicinity are using a same type of radar, with similar types of transmitting waveforms, it is known that they can cause false alarms (so-called 'ghost target') or they may degrade the sensitivity of each other. The detection of interference may be performed, for example, through digital signal processing of the spectrum of the received signal, and by observing a noise floor or tones that exceed a theoretical maximum magnitude, etc.

In some examples, the radar unit may be reconfigured in-situ by the user or the main processor of the vehicle, dependent upon a type of interference or jamming signal that the radar unit encounters, as well as any real-time operational environment that the radar unit detects or is configured for. In mobile vehicle-based radar applications (that will be different from radars used in other applications, for which most of them are stationary), the re-configurability examples herein described support multiple real-life operational scenarios, for example operation in high-speed motorways, and urban areas, with or without a stationary and mobile objects in their vicinity. It is envisaged, in some examples, that the architecture herein described may be used, say as a FMCW where more output power is concentrated in one frequency, so it has a better range performance, but where it may be more susceptible to interference from the same type of interfering radar. The architecture herein described may be used, say, as a PMCW radar when the prevailing operational condition(s) is/are less susceptible to interference, but where there is a lower peak power and a demand for more computational power. The architecture herein described may be used, say, as a UWB impulse radar, when a good range resolution is desired and where it may be easy to adapt the range resolution by adjusting pulse width. Similarly, the architecture herein described may be used, say, as a UWB impulse radar when it also has a low power consumption and may be needed to provide a wide coverage in azimuth angle but only provide range information (hence it is robust against interference, and is a useful option to use for short distance target detection, such as a parking and stop and go sensor). In some examples, the detection may be performed in the digital domain, by processing the receive signals, and/or assisted by other sensors equipped by the car, e.g. camera, Lidar, etc. In this manner, this reconfigurable radar architecture is able to increase the robustness and safety over known non-reconfigurable radar units, at least for automotive applications.

The mmW/RF IC (or domain) 220 may support multiple transceiver channels and include circuits and components that function across these, such as: power amplifiers (PA(s)), low noise amplifiers (LNA(s)), mixer(s), multiplier(s) or divider(s), voltage controlled oscillator (VCO), transmission lines, and so on. In some examples the baseband and analog signal IC (or domain) 240 also includes circuits and components such as: programmable gate array(s), low-pass filter(s) (LPFs), high-pass filter(s) (HPFs), digital-to-analog converters DAC(s), analog-to-digital converters ADC(s), waveform modulator(s), pulse shaper(s), phase locked loop (s), serial to parallel interfaces (SPIs), and so on. The digital IC (or domain) 250 may include circuits and components such as: a microprocessor, digital signal processor(s) (DSPs), memory, and so on. A digitally processed output signal 258 is output from the digital IC (or domain) 250.

In accordance with example embodiments of the invention, radar sensitivity monitor and architecture reconfiguration control unit 260 is configured to determine the prevailing operational conditions of the reconfigurable radar unit 200 and, in response thereto, select a suitable radar operational mode to be adopted and, in some examples, enable the circuits and components in the respective domains/ICs to support the selected radar operational mode. In this manner, in one example, the radar sensitivity monitor and architecture reconfiguration control unit 260 supports a dynamically selectable 77-81 GHz mmW radio frequency (RF) radar architecture that supports the processing of multiple possible radar signal types. Alternatively, in some examples, the radar sensitivity monitor and architecture reconfiguration control unit 260 may provide a sensed signal detailing one or more prevailing operational conditions of the radar unit 200, and send this sensed signal to the digital IC (or domain) 250, for a signal processor located therein to propose which radar configuration and associated circuits and components to activate/enable.

In accordance with example embodiments of the invention, the digital IC (or domain) 250 has been configured to support multiple radar configurations and radar signal types from a single (or multiple) signal processing unit(s). In accordance with example embodiments of the invention, the baseband and analog signal IC (or domain) 240 has been configured, in the transmission side, to include three different signal conditioning paths in parallel, with and two-three different signal conditioning paths in the receiving side.

In accordance with example embodiments of the invention, the mmW/RF IC (or domain) 220 has been configured to support, primarily, multiple radar signal types using a single radar RF architecture. The mmW/RF IC (or domain) 220 that includes a power amplifier (PA), low noise amplifier (LNA) voltage controlled oscillator (VCO) are reused across all radar operational modes and signal types, as all the operational modes in an automotive radar application are in the same frequency band (76-81 GHz). In this manner, the use of duplicate radar RF ICs may be avoided and a re-use of a single reconfigurable radar architecture can be actively used. The use of a single radar RF architecture (rather than multiple parallel architectures used to support multiple radar signal types) is beneficial in terms of power consumption and silicon area of a radar unit, where the mmW front-end circuits tend to dominate close to 70% of the power consumption and silicon area. This is particularly useful in the example application of an automotive radar system, whereby the spectrum regulation specifies the same frequency range (77-81 GHz) for all radar operations, irrespective of the radar technology principle that is adopted. In accordance with some example embodiments of the invention, the mmW/RF IC (or domain) 220 has been configured to support additional optional radar signal processing types, e.g. radar signal processed in quadrature form.

A skilled artisan will recognise that if different radar architectures do not operate in the same frequency band (for example, 77 GHz and 24 GHz), some of the mmW circuitry cannot be shared. Also, if a user wishes to select the highest performance in a particular situation, then a decision an architecture that uses, at least in part, separate dedicated mmW/RF front-end circuits may be used. However, for the baseband and digital domain circuits, a different decision may also be made if minimizing power consumption is not the first concern, and better flexibility is desired. In this situation, a high performance DAC may be adopted, in order to replace all the dedicated signal generation sub-blocks (e.g. pulse generator, pulse shaper, waveform modulator, etc . . . ), together with a high performance but power hungry ADC located in the receive path.

In some examples of the invention, the mmWave/RF circuit is shared as much as reasonably practical, as the mmW/RF components are bulky and consume large chip area. In contrast, some baseband circuits are separated in order to achieve the most performance out of the current state of the art implementations, as well as benefiting from their power and silicon area consumption being much less compared to the mmW/RF circuits. Furthermore, in some examples, the digital signal processing circuit is shared as much as practically possible, as the digital circuit provides good re-configurability using the same gate resources.

Figure 3:
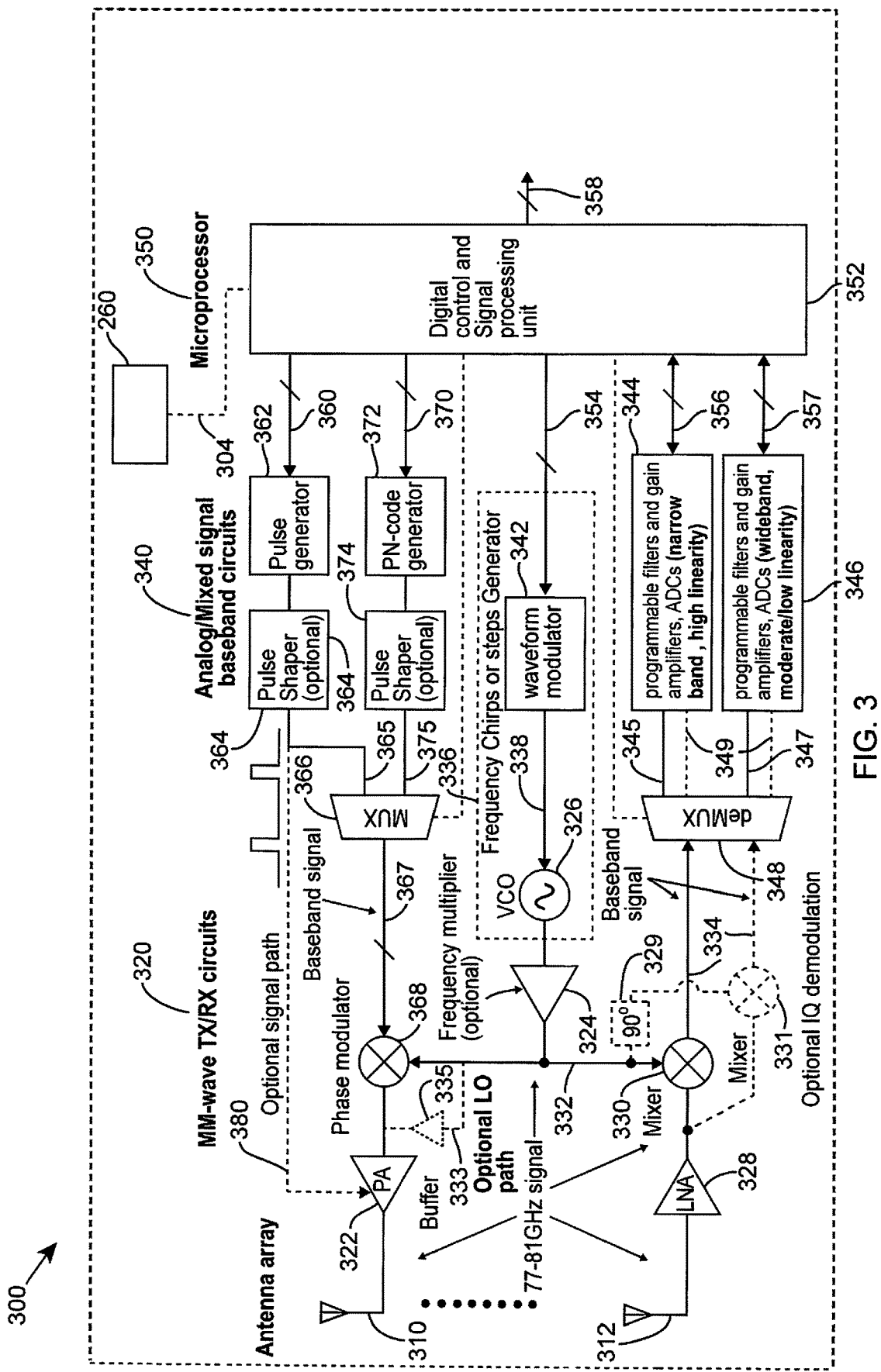
FIG. 3 illustrates an example detailed block diagram of the proposed reconfigurable, multi operation mode, radar unit and IC architecture, according to example embodiments of the invention.

Referring now to FIG. 3, an example overview block diagram of the proposed reconfigurable multi operation mode radar unit 300 is illustrated. In the illustrated example, only one transceiver (transmitter and receiver) is shown for simplicity purposes. In other examples, it is envisaged that the concepts herein described may be applied to ICs containing multiple transceivers in parallel, such as in a multiple-in multiple-out (MIMO) systems or phased array radar systems. The multi operation mode radar unit architecture 300 includes one or more transmitter antenna(e) 310 and one or more receiver antenna(e) 312 and, in this example, three separate integrated circuit (IC) functions: a mmW transceiver (TxRx) circuit 320, an analog/mixed signal baseband circuit 340 and a microprocessor IC 350. The multi operation mode radar unit 300 includes a radar sensitivity monitor and architecture reconfiguration control unit 260 configured to monitor a radar performance and, in response thereto, initiate a change in the radar operational mode. In some examples, the radar sensitivity monitor and architecture reconfiguration control unit 260 may be configured to determine the prevailing operational conditions of the radar unit and, in response thereto, select a suitable radar operational mode that is better suited for the determined prevailing operational conditions. In this manner, in one example, the radar sensitivity monitor and architecture reconfiguration control unit 260 supports a dynamically selectable 77 GHz mmW radio frequency (RF) operational mode and, in some examples is configured to select and activate/enable associated circuitry to support that operational mode. Thus, the radar sensitivity monitor and architecture reconfiguration control unit 260 provides a control signal to the microprocessor IC 350 to propose (or provide the prevailing operational conditions information for the microprocessor IC 350 to select) which radar configuration to activate/enable.

In a transmitter sense, for a first FMCW mode of operation, the microprocessor IC 350 includes a digital control and signal processing unit 352 that provides a first transmit radar signal 354 to a frequency chirp generator circuit that includes a waveform generator 342 in the analog/mixed signal baseband circuit 340. The waveform generator 342 provides a signal 338 that is to be modulated to a voltage controlled oscillator circuit 326. The modulated signal is then optionally passed to a frequency multiplier 324 (if the VCO generated signal is not at the operating frequency of the FMCW radar unit 300). The high-frequency output 332 of the frequency multiplier 324 is passed to a power amplifier 322 via a buffer 335 and an optional local oscillator path 333, where it is amplified and routed to the one or more transmitter antenna(e) 310.

In a transmitter sense, for a first example of a second UWB pulse mode of operation, the digital control and signal processing unit 352 provides a second transmit radar signal 360 to a pulse generator circuit 362 in the analog/mixed signal baseband circuit 340. The pulse generator circuit 362 generates a pulsed signal that may be shaped in optional pulse shaper 364 and is routed 365 to a multiplexer 366. The multiplexer 366 is controlled by a control signal, which in this example is provided by digital control and signal processing unit 352. If selected, the multiplexer 366 outputs the pulsed (shaped) signal 367 in a baseband form to an up-mixer 368. The up-mixer 368 up-converts the pulsed (shaped) signal 367 in a baseband form into a high-frequency radar signal by mixing it with a high-frequency local oscillator signal generated by voltage controlled oscillator circuit 326. The modulated up-converted pulsed (shaped) signal is then passed to the power amplifier 322, where it is amplified and routed to the one or more transmitter antenna(e) 310.

In a transmitter sense, for a second example of the second UWB pulse mode of operation, the digital control and signal processing unit 352 provides a second transmit radar signal 360 to a pulse generator circuit 362 in the analog/mixed signal baseband circuit 340. The pulse generator circuit 362 generates a pulsed signal that may be shaped in optional pulse shaper 364 and is routed direct to the power amplifier 322 as an optional signal path. In this second example of the UWB pulse mode of operation, a pulsed modulation radar signal is generated through a high frequency switching circuit and short pulse generation circuit inside the power amplifier 322, which modulates the transmitting signal by turning it 'on' and 'off'. The repetition interval of the pulse train is controlled by a pulse generator circuit, e.g. optional pulse shaper 364.

In a transmitter sense, for a third Pseudo-random Noise (PN) code mode of operation, the digital control and signal processing unit 352 provides a third transmit radar signal 370 to a PN code generator circuit 362 in the analog/mixed signal baseband circuit 340. The PN coded generator circuit 372 generates a PN code signal that may be shaped in optional pulse shaper 374 and is routed 375 to multiplexer 366. The multiplexer 366 is controlled by a control signal, which in this example is provided by digital control and signal processing unit 352. If selected, and based on the control signal, the multiplexer 366 outputs the pulsed (shaped) signal 367 in a baseband form to an up-mixer 368. The up-mixer 368 up-converts the pulsed (shaped) signal 367 in a baseband form into a high-frequency radar signal by mixing it with a high-frequency local oscillator signal generated by voltage controlled oscillator circuit 326. The modulated up-converted pulsed (shaped) signal is then passed to the power amplifier 322, where it is amplified and routed to the one or more transmitter antenna(e) 310.

In a receiver sense, a first received radar signal may be received at the one or more receiver antenna(e) 312 and passed to a low noise amplifier (LNA) 328 where it is amplified. The amplified received radar signal is passed to a down-mixer 330, where it is mixed with a high-frequency un-modulated signal 332 output from the VCO 326. The down-converted received radar signal 334 from down-mixer 330 is input to a demultiplexer 348, which is controlled by a control signal, which in this example is provided by digital control and signal processing unit 352. If selected, and based on the control signal, the demultiplexer 348 outputs a wideband baseband signal 345 (typically from a few hundred MHz to a few GHz) to a first programmable baseband circuit 344 that includes one or more programmable filter(s) and one or more gain amplifiers, as well as an analog-to-digital converter (ADC). The first programmable baseband circuit 344 outputs a digitized wideband, moderate-linearity signal 356 to the digital control and signal processing unit 352 for processing and the received processed radar signal 358 is output to the central processor of the vehicle where the radar detection data (e.g. range, speed, angle of objects, interference presence, etc. information) is further processed.

In a receiver sense, a second received radar signal may be received at the one or more receiver antenna(e) 312 and passed to the LNA 328 where it is amplified. The amplified received radar signal is passed to a down-mixer 330, where it is mixed with a high-frequency un-modulated signal 332 output from the VCO 326. The down-converted received radar signal 334 from down-mixer 330 is input to the demultiplexer 348, which is controlled by a control signal, which in this example is provided by digital control and signal processing unit 352. If selected, and based on the control signal, the demultiplexer 348 outputs a wideband baseband signal 347 to a second programmable baseband circuit 346 that includes one or more programmable filter(s) and one or more gain amplifiers, as well as an analog-to-digital converter (ADC). The second programmable baseband circuit 346 outputs a wideband, low (or moderate) linearity signal 357 to the digital control and signal processing unit 352 for processing and the received processed radar signal 358 is output.

In a receiver sense, a third received radar signal may be received at the one or more receiver antenna(e) 312 and passed to the LNA 328 where it is amplified. The amplified received radar signal is, in this example mode of operation, passed to a quadrature down-mixer composed of two independent mixers (forming the I and Q signal path), 330 and 331, where it is quadrature down-mixed with both in phase and quadrature phase shifted 329 high-frequency signal output from the VCO 326. The quadrature down-converted received radar signal 334 from down-mixer 331, when the quadrature signal processing is selected, includes both an in-phase ('I') signal and a quadrature ('Q') signal. Thus, corresponding circuits in both I/Q paths are activated, and both I and Q signals are routed to either the first programmable baseband circuit 344 or the second programmable baseband circuit 346, via demultiplexer 348, dependent upon the mode selection. The first programmable baseband circuit 344 and the second programmable baseband circuit 346 include one or more programmable filter(s) and one or more gain amplifiers, as well as an analog-to-digital converter (ADC). The quadrature signal processing allows complex signal processing to enhance the performance of the receiver (e.g. sensitivity, bandwidth, etc.). The quadrature baseband signals output from the first and second programmable baseband circuits 344, 346 are input 356 or 357 to the digital control and signal processing unit 352 for processing and the received processed radar signal 358 is output.

The architecture of FIG. 3 advantageously provides a good compromise when attempting to be re-configurable to support a range of differing performance levels, in terms of cost, power consumption and silicon area, and re-configurability.

Figure 4:
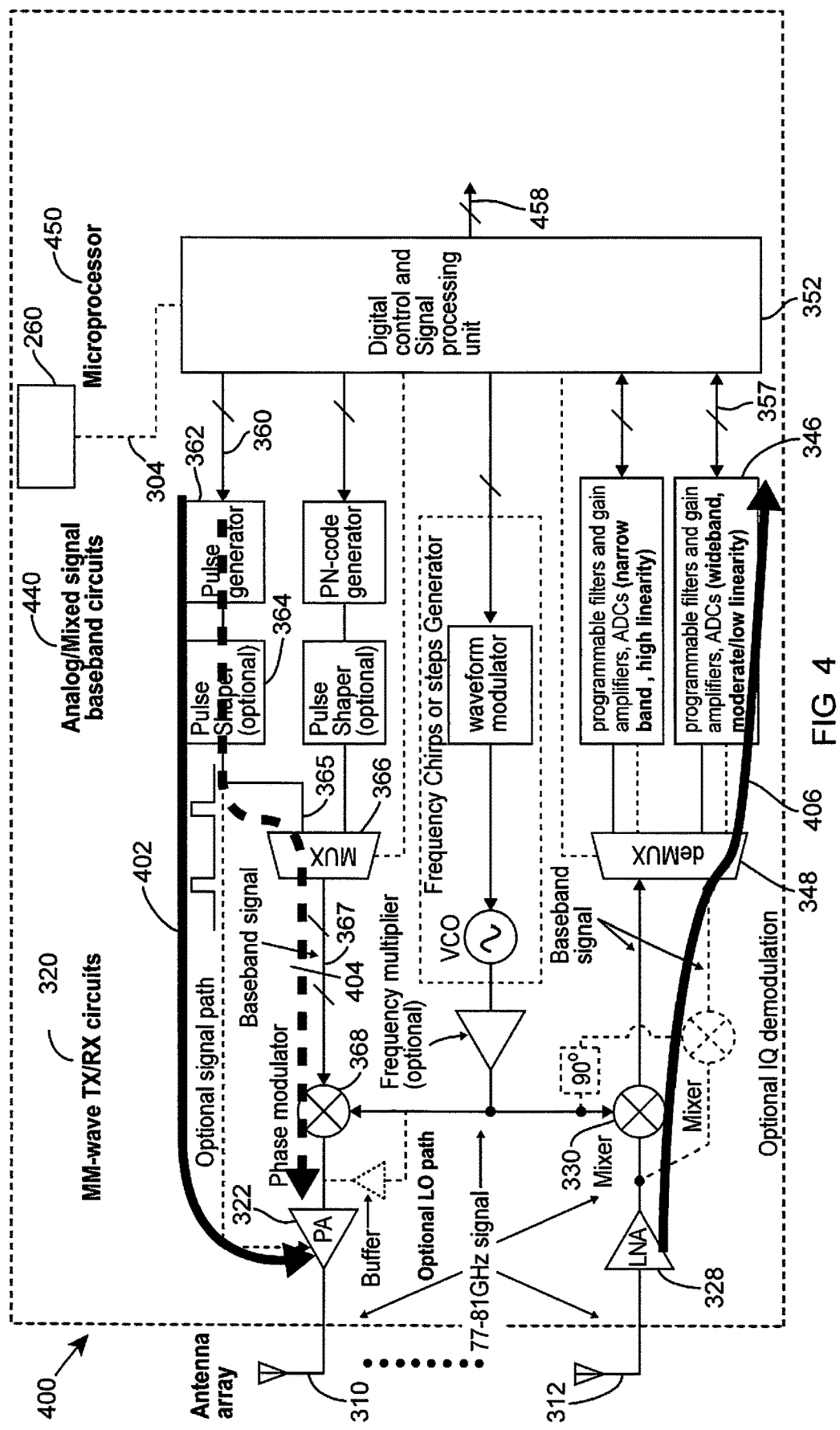
FIG. 4 illustrates a circuit enable and signal flow diagram of the reconfigurable multi operation mode radar unit, following a selection of an ultra-wideband operational mode for the radar IC architecture of FIG. 3, according to example embodiments of the invention.

Referring now to FIG. 4, a circuit enable and signal flow diagram 400 of the multi operation mode radar unit, following a selection of an ultra-wideband (UWB) operational mode for the reconfigurable radar unit of FIG. 3 is illustrated, according to example embodiments of the invention. The multi operation mode radar unit architecture includes one or more transmitter antenna(e) 310 and one or more receiver antenna(e) 312 and, in this example, three separate integrated circuit (IC) functions: a mmW transceiver (TxRx) circuit 420, an analog/mixed signal baseband circuit 440 and a microprocessor IC 450. The multi operation mode radar unit architecture 300 includes a radar sensitivity monitor and architecture reconfiguration control unit 260 configured to determine the prevailing operational conditions of the radar unit and, in response thereto, in this example, selects an UWB operational mode. In a first example UWB operational mode, an UWB impulse transceiver in the transmitting path follows path 402 or path 404 and in a receiving path follows path 406.

When the transmitting path 404 is selected, the digital control and signal processing unit 352 provides a first UWB transmit radar signal 360 to a pulse generator circuit 362 in the analog/mixed signal baseband circuit 440. The pulse generator circuit 362 generates a pulsed signal that may be shaped in optional pulse shaper 364 and is routed 365 to a multiplexer 366. The multiplexer 366 is controlled by a control signal, which in this example is provided by digital control and signal processing unit 352. If selected, and based on the control signal, the multiplexer 366 outputs the pulsed (shaped) signal 367 in a baseband form to an up-mixer 368. The up-mixer 368 up-converts the pulsed (shaped) signal 367 in a baseband form into a high-frequency radar signal by mixing it with a high-frequency local oscillator signal generated by voltage controlled oscillator circuit 326. The modulated up-converted pulsed (shaped) signal is then passed to the power amplifier 322, where it is amplified and routed to the one or more transmitter antenna(e) 310.

When the transmitting path 402 is selected, the digital control and signal processing unit 352 provides a second transmit radar signal 360 to a pulse generator circuit 362 in the analog/mixed signal baseband circuit 340. The pulse generator circuit 362 generates a pulsed signal that may be shaped in optional pulse shaper 364 and is routed direct to the power amplifier 322 as an optional signal path. In this second example of the UWB pulse mode of operation, a control signal from optional pulse shaper 364 may be used to control a high-frequency switch (not shown) within the PA 322 that modulates the amplitude of the signal from up-mixer 368 to be transmitted.

In a receiver sense, the UWB received radar signal is received at the one or more receiver antenna(e) 312 and passed to the low noise amplifier (LNA) 328 where it is amplified. The amplified received radar signal is passed to a down-mixer 330, where it is mixed with the high-frequency signal 332 output from the VCO 326. The down-converted received radar signal 334 from down-mixer 330 is input to the demultiplexer 348, which is controlled by a control signal, which in this example is provided by digital control and signal processing unit 352. The demultiplexer 348 outputs a wideband baseband signal 347 to a wideband programmable baseband circuit 346 that includes one or more programmable filter(s) and one or more gain amplifiers, as well as an analog-to-digital converter (ADC). The wideband programmable baseband circuit 346 includes a moderate-to-low resolution ADC that processes wideband signal ranges from a few hundred MHz to multiple GHz. The wideband programmable baseband circuit 346 outputs a digital signal 357 to the digital control and signal processing unit 352 for processing and the received processed radar signal 458 is output.

Figure 5:
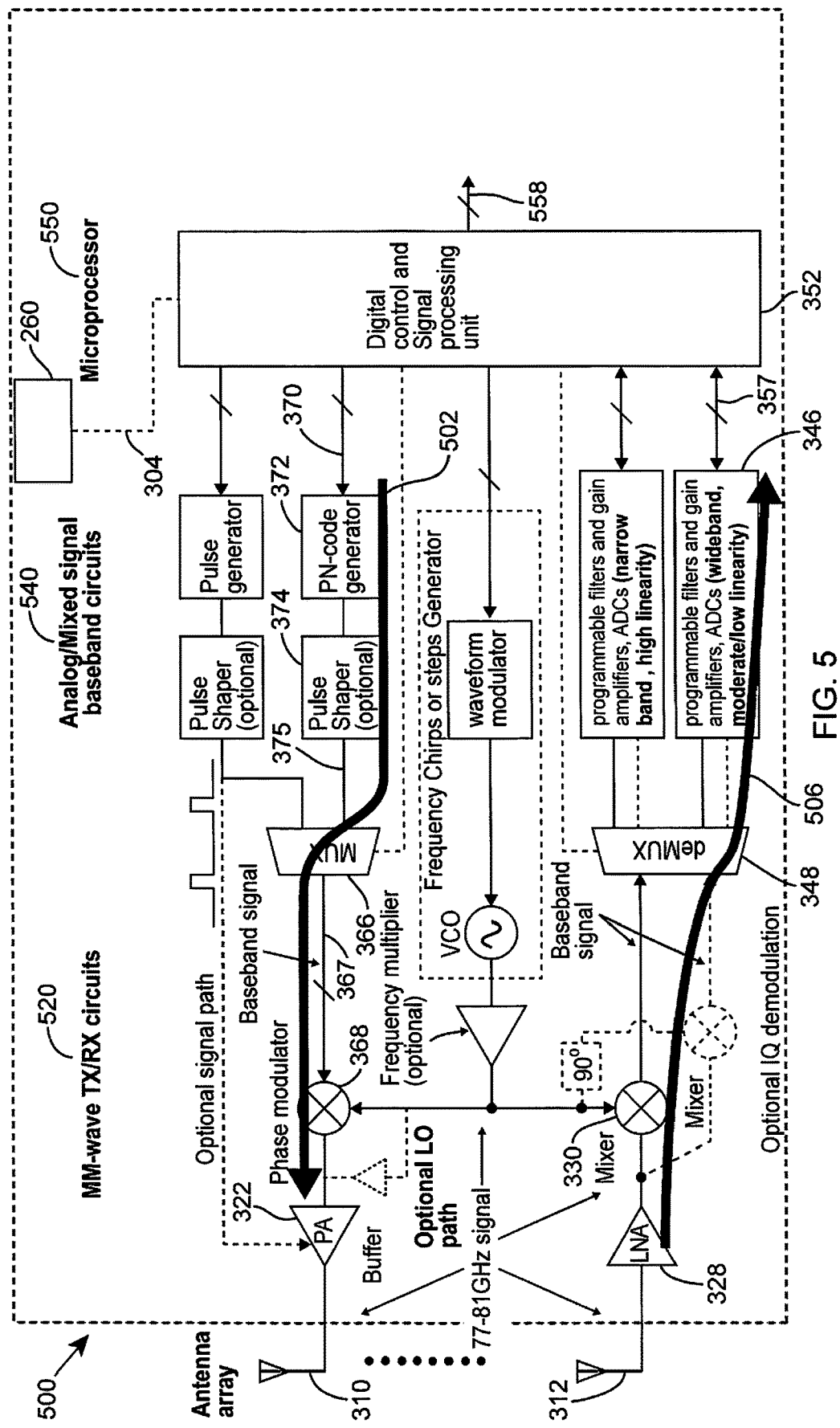
FIG. 5 illustrates a circuit enable and signal flow diagram of the reconfigurable multi operation mode radar unit, following a selection of a PMCW operational mode for the radar IC architecture of FIG. 3, according to example embodiments of the invention.

Referring now to FIG. 5, a circuit enable and signal flow diagram of the multi operation mode radar unit, following a selection of a PMCW operational mode for the radar IC architecture of FIG. 3, is illustrated, according to example embodiments of the invention. The multi operation mode radar unit architecture includes one or more transmitter antenna(e) 310 and one or more receiver antenna(e) 312 and, in this example, three separate integrated circuit (IC) functions: a mmW transceiver (TxRx) circuit 520, an analog/mixed signal baseband circuit 540 and a microprocessor IC 550. The multi operation mode radar unit architecture 300 includes a radar sensitivity monitor and architecture reconfiguration control unit 260 configured to determine the prevailing operational conditions of the radar unit and, in response thereto, in this example, selects a PMCW operational mode. In a PMCW operational mode, a PMCW transceiver in the transmitting path follows path 502 and in a receiving path follows path 506.

In a transmitter sense, for a PMCW mode of operation, the digital control and signal processing unit 352 provides a transmit radar signal 370 to a Pseudo-random Noise (PN) code generator circuit 362 in the analog/mixed signal baseband circuit 540. In some examples, the phase modulator in the transmitter path may be a binary phase modulator or a poly phase modulator, for example built by two binary phase modulators located in parallel. The PN coded generator circuit 372 generates a binary phase coded signal or a PN coded waveform signal that may be shaped in optional pulse shaper 374 and is routed 375 to multiplexer 366. The multiplexer 366 is controlled by a control signal, which in this example is provided by digital control and signal processing unit 352. If selected, and based on the control signal, the multiplexer 366 outputs the pulsed (shaped) signal 367 in a baseband form to an up-mixer 368. The up-mixer 368 up-converts the pulsed (shaped) signal 367 in a baseband form into a high-frequency radar signal by mixing it with a high-frequency local oscillator signal generated by voltage controlled oscillator circuit 326. The modulated up-converted pulsed (shaped) signal is a phased modulated continuous wave signal that is then passed to the power amplifier 322, where it is amplified and routed to the one or more transmitter antenna(e) 310. In this regard, up-mixer 368 functions as a phase modulator 368 that mixes the PN code sequence with the LO signal, therefore phase of the continuous wave signal is modulated (at each code periods).

In a receiver sense, the PMCW received radar signal is received at the one or more receiver antenna(e) 312 and passed to the low noise amplifier (LNA) 328 where it is amplified. The amplified received radar signal is passed to a down-mixer 330, where it is mixed with the high-frequency signal 332 output from the VCO 326. The down-converted received radar signal 334 from down-mixer 330 is input to the demultiplexer 348, which is controlled by a control signal, which in this example is provided by digital control and signal processing unit 352. The demultiplexer 348 outputs a wideband baseband signal 347 to a programmable baseband circuit 346 that includes one or more programmable wideband filter(s) and one or more gain amplifiers, as well as an analog-to-digital converter (ADC). The wideband programmable baseband circuit 346 includes a moderate-to-low resolution ADC that processes wideband signal ranges from a few hundred MHz to multiple GHz. In some examples, it is noted that the moderate-to-low resolution ADC is similar to the UWB impulse receiving path; however the required resolution on the ADC may be different. The wideband programmable baseband circuit 346 outputs a digital signal 357 to the digital control and signal processing unit 352 for processing and the received processed radar signal 558 is output.

Figure 6:
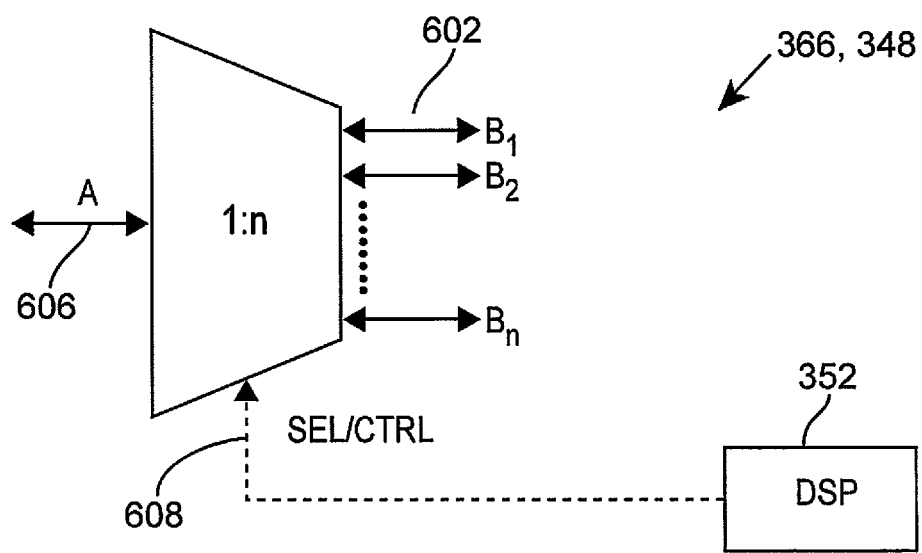
FIG. 6 illustrates a block diagram of a multiplexer for use in selecting one of the architectures of the proposed reconfigurable multi-operation mode radar IC architecture of FIG. 3, according to example embodiments of the invention.

FIG. 6 illustrates a block diagram of a multiplexer or demultiplexer 366, 348 for use in selecting one of the architectures of the proposed multi operation mode radar IC architecture of FIG. 3, according to example embodiments of the invention. The multiplexer or demultiplexer 366, 348 is, in this example, a switch multiplexer that is configured to connect one input 606 to one of a number of outputs 602, or vice versa. The connection performed by the multiplexer or demultiplexer 366, 348 is controlled based on a selection and control signal 608. In this example, the selection and control signal 608 may be controlled by the radar sensitivity monitor and architecture reconfiguration control unit 260 or the digital control and signal processing unit 352 of FIG. 3. In an FMCW mode, the multiplexer 366 is disabled and only outputs a constant value.

Figure 7:
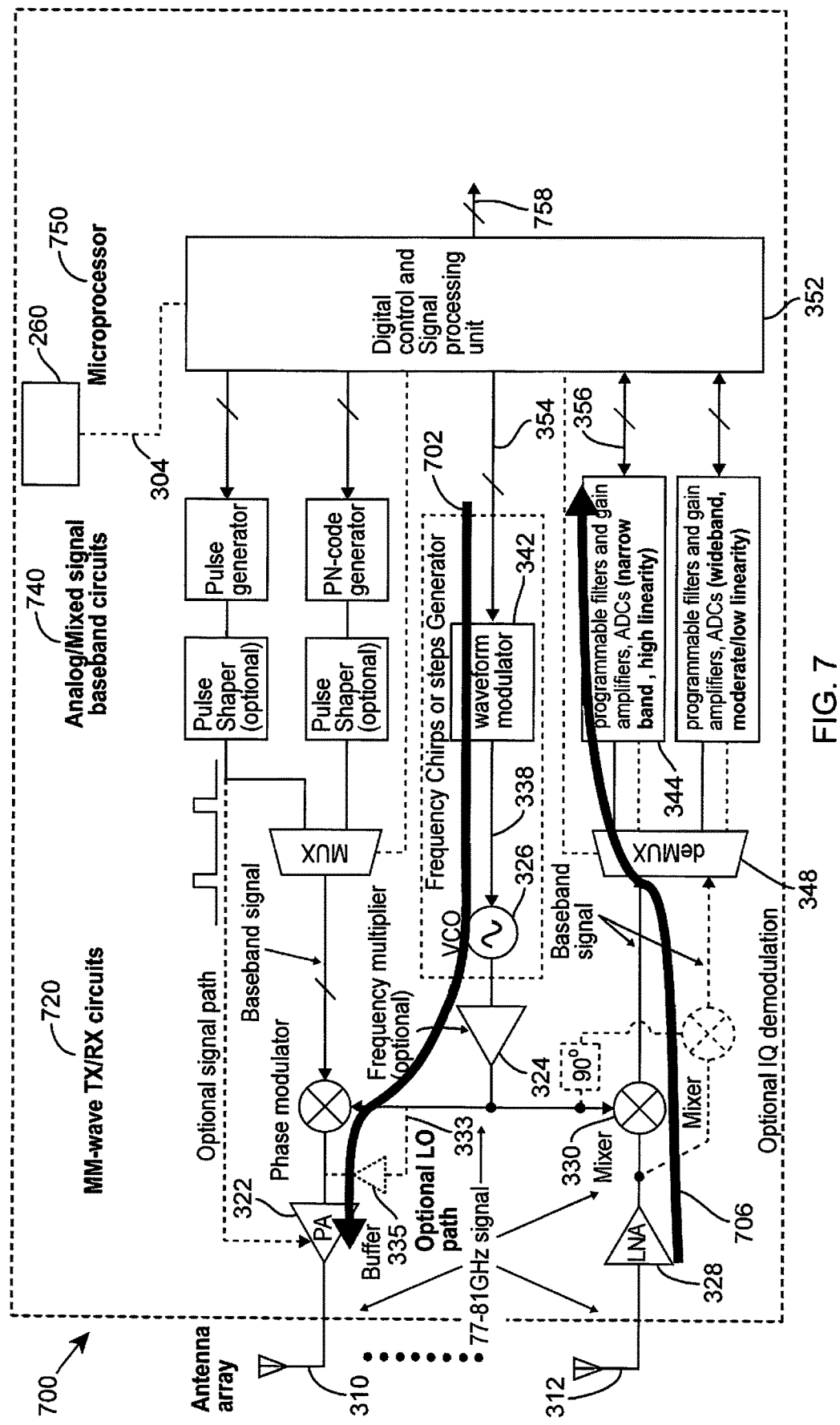
FIG. 7 illustrates a circuit enable and signal flow diagram of the reconfigurable multi operation mode radar unit, following a selection of a FMCW/FSK operational mode for the radar IC architecture of FIG. 3, according to example embodiments of the invention.

Referring now to FIG. 7, a circuit enable and signal flow diagram 700 of the multi operation mode radar unit following a selection of a FMCW/FSK operational mode for the radar IC architecture of FIG. 3 is illustrated, according to example embodiments of the invention. The multi operation mode radar unit architecture includes one or more transmitter antenna(e) 310 and one or more receiver antenna(e) 312 and, in this example, three separate integrated circuit (IC) functions: a mmW transceiver (TxRx) circuit 720, an analog/mixed signal baseband circuit 740 and a microprocessor IC 750. The multi operation mode radar unit architecture 300 includes a radar sensitivity monitor and architecture reconfiguration control unit 260 configured to determine the prevailing operational conditions of the radar unit and, in response thereto, in this example, selects an FMCW/FSK operational mode. In an FMCW/FSK operational mode, an FMCW/FSK transceiver in the transmitting path follows path 702 and in a receiving path follows path 706.

In a transmitter sense, for a selected FMCW/FSK mode of operation, the microprocessor IC 350 includes a digital control and signal processing unit 352 that provides a first transmit radar signal 354 to a frequency chirp generator circuit that includes a waveform generator 342 (sometimes referred to as a waveform modulator) in the analog/mixed signal baseband circuit 740. The waveform generator 342 provides a signal 338 that is to be modulated to a voltage controlled oscillator circuit 326.

In some examples, the waveform generator 342 may be a DAC or part of a frequency synthesizer. In some examples, the waveform generator 342 may be designed to support multiple continue waveform modes, such as FMCW mode by generating various frequency-modulated waveforms (e.g. a sawtooth (up or down) or triangular waveform), a frequency shift keyed (FSK) mode by generating stepped frequency modulated waveforms, and/or linearly frequency-stepped waveform (LFSW), which is a combination of FMCW and FSK.

The modulated signal is then optionally passed to a frequency multiplier 324 (if the VCO generated signal is not at the operating frequency of the FMCW radar unit 300). The high-frequency output 332 of the frequency multiplier 324 is passed to a power amplifier 322 via a buffer 335 and an optional local oscillator path 333, where it is amplified and routed to the one or more transmitter antenna(e) 310.

In a receiver sense, a first received radar signal may be received at the one or more receiver antenna(e) 312 and passed to a LNA 328 where it is amplified. The amplified received radar signal is passed to a down-mixer 330, where it is mixed with the high-frequency signal 332 output from the VCO 326. The down-converted received radar signal 334 from down-mixer 330 is input to a demultiplexer 348, which is controlled by a control signal, which in this example is provided by digital control and signal processing unit 352. If selected, and based on the control signal, the demultiplexer 348 outputs a narrowband baseband signal 345 to a first programmable baseband circuit 344 that includes one or more programmable bandpass filter(s) and one or more gain amplifiers, as well as a highly linear ADC that processes a relative narrow band signal, for example in a range between a few kHz up to 10 to 20 MHz. The first programmable baseband circuit 344 outputs a narrowband, high linearity signal 356 to the digital control and signal processing unit 352 for processing and the received processed radar signal 758 is output.

Figure 8:
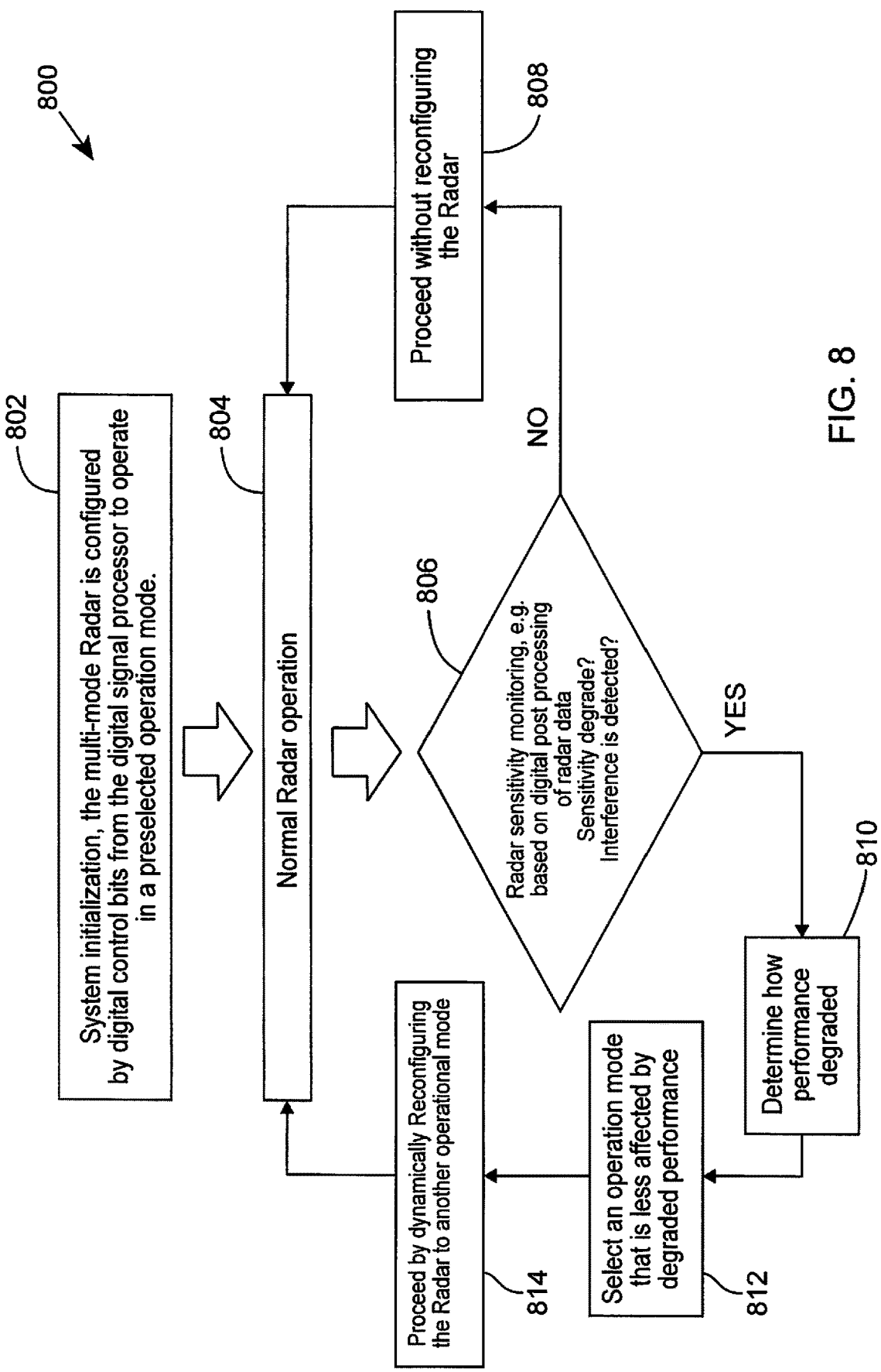
FIG. 8 illustrates an example flowchart for selecting one of the proposed reconfigurable multi operation mode radar IC architecture, according to an example embodiment of the invention.

Referring now to FIG. 8, an example flowchart 800 for selecting one of the proposed multi operation mode radar IC architectures is illustrated, according to an example embodiment of the invention. At 802, the radar unit system is initialized and the reconfigurable radar unit configured to operate in a default operational mode. In one example, this may be achieved by selecting a transmit radar signal by the digital signal processor 352 (of FIG. 3) and configuring the digital control bits to operate the multiplexer 366 or demultiplexer 348 in a preselected operational mode. Thereafter, at 804, the reconfigurable radar unit operates in a normal operation, for that selected operational mode. At 806, a determination is made as to whether the radar performance has changed, for example by the radar sensitivity monitor and architecture reconfiguration control unit 260 monitoring radar data, e.g. based on digital post-processing of radar data. One example of a radar performance change could be a sensitivity degrade to indicate that interference has been detected, for example. If there is not a radar performance change in 806, then the reconfigurable radar unit proceeds without reconfiguration in 808 and loops back to 804.

In some examples, it is envisaged that the radar unit may also be re-configured to operate in a time division duplex (TDD) mode of operation, across some, many or all of the different operation modes. In this manner, operating in a TDD mode may lower the chances of being jammed by interference. In some examples, it is envisaged that the radar unit may also be re-configured to operate using a combination of multiple radar detectors across some, many or all of the different operation modes, in order to benefit from the combined advantages of each (such as increased detection robustness).

However, if there is a radar performance change in 806, then, in this example, the reconfigurable radar unit determines how the performance has changed in 810. At 812, the reconfigurable radar unit then selects an operational mode that is less affected by the degraded performance. At 814, the reconfigurable radar unit then proceeds with a dynamic, real-time, reconfiguration to the new operational mode and loops back to 804. In examples of the invention, 814 includes dynamically re-configuring at least a portion (and in some operational modes, all) of at least one of the mixed analog and baseband integrated circuit and signal processor circuit to effect a change in the radar operational mode in response to the monitored radar performance. In some examples, 814 may also include re-configuring at least a portion (and in some operational modes, all) of a mmW transceiver circuit.

In some examples, the reconfigurable radar unit that is configurable to support multi operational modes may be programmed through dedicated software or firmware to support different operational principles. In some examples the control bits to the multiplexer 366 and demultiplexer 348 may be additionally controllable by a user interface, thereby allowing users to exploit the potential of the multi operational mode reconfigurable radar unit, for example, switching among modes utilizing on different operation principle during operation to enhance performance of their systems. For example, in an urban area with dense traffic, the sensitivity of one particular operation mode may be degraded due to mutual interference of other vehicles. In this situation, the digital signal processor control unit 352 or the vehicle user may reconfigure the reconfigurable radar unit to function in a different operational mode that is less susceptible to the particular type of interference encountered.

Although examples of the invention are described with reference to a radar unit for an automotive safety system, it is envisaged that the concepts herein described may be applicable to other applications, such as radar for robotics or drones.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A reconfigurable radar unit comprises:
    a millimetre wave (mmW) transceiver (Tx/Rx) circuit configured to radiate a transmit radar signal and receive an echo signal thereof;
    a mixed analog and baseband integrated circuit; and
    a signal processor circuit;
    wherein the mmW Tx/Rx circuit and mixed analog and baseband integrated circuit and signal processor circuit are configured to support a plurality of radar operational modes; and
    a radar sensitivity monitor and architecture reconfiguration control unit coupled to the signal processor circuit and configured to monitor a radar performance and, wherein the radar sensitivity monitor and architecture reconfiguration control unit determines whether a vehicle in a vicinity to the radar sensitivity monitor and architecture reconfiguration control unit is using a same type of radar unit, in response thereto, initiates a change in the radar operational mode.

2. The reconfigurable radar unit of claim 1 wherein the radar sensitivity monitor and architecture reconfiguration control unit is configured to initiate a switch between more than two radar operational modes in a real-time manner.

3. The reconfigurable radar unit of claim 1 wherein the radar sensitivity monitor and architecture reconfiguration control unit is configured to activate/enable associated circuitry to support the selected radar operational mode.

4. The reconfigurable radar unit of claim 1 wherein the plurality of radar operational modes is three or more radar operational modes.

5. The reconfigurable radar unit of claim 1 wherein the reconfigurable radar unit is configured to support more than two radar operational modes from a group of: frequency modulated continuous wave (FMCW), pulse mode continuous wave (PMCW), frequency shift keyed (FSK), ultra-wideband (UWB) impulse radar, Pulse Doppler radar, and quadrature radar signal processing.

6. The reconfigurable radar unit claim 1 further comprising at least one switching circuit located between the mixed analog and baseband integrated circuit and the mmW Tx/Rx circuit, wherein the at least one switching circuit is controlled by the signal processor circuit or the radar sensitivity monitor and architecture reconfiguration control unit to route a selected transmit radar signal to a first antenna in a transmit path and receive an echo signal from a second antenna in a receive path.

7. The reconfigurable radar unit of claim 6 wherein the at least one switching circuit comprises a multiplexer in a transmit path and a demultiplexer in a receive path configured to receive at least one path select control signal from the signal processor circuit in response to a selected radar operational mode.

8. The reconfigurable radar unit of claim 1 wherein the mmW Tx/Rx circuit is a single reconfigurable mmW Tx/Rx circuit configured to support multiple radar signal types.

9. The reconfigurable radar unit of claim 1 wherein the mixed analog and baseband integrated circuit is configured to support at least three different signal conditioning paths in a transmitting side.

10. The reconfigurable radar unit of claim 1 the mixed analog and baseband integrated circuit is configured to support at least two different signal conditioning paths in a receiving side.

11. The reconfigurable radar unit of claim 1 wherein the reconfigurable radar unit comprises one from a group of:
    single chip transceiver that comprises the mmW Tx/Rx circuit, the mixed analog and baseband integrated circuit and the signal processing integrated circuit;
    a dual integrated circuit transceiver that comprises a mmW Tx/Rx integrated circuit and the mixed analog and baseband integrated circuit and wherein the signal processor is located on one of the two integrated circuits;
    a triple integrated circuit transceiver that comprises the mmW TX/RX circuit, the mixed analog and baseband integrated circuit and a signal processing integrated circuit.

12. The reconfigurable radar unit of claim 1 wherein the mmW Tx/Rx circuit is configured to operate in a 77-81 GHz communication frequency range.

13. An analog and mixed signal baseband integrated circuit for a reconfigurable radar unit comprising in a transmit side:
    a plurality of radar signal generator circuits; and
    a multiplexer coupled to the plurality of radar signal generator circuits and configured to select a radar signal generated by one of the plurality of radar signal generator circuits for transmission by the reconfigurable radar unit, wherein selection of the radar signal is based on a determination of whether a vehicle in a vicinity to the reconfigurable radar unit is using a same type of radar unit;
    and comprising in a receive side:
    a plurality of radar baseband programmable circuits;
    a demultiplexer coupled to the plurality of plurality of radar baseband programmable circuits and configured to select one of the plurality of radar baseband programmable circuits for processing a received radar signal based on the transmission by the reconfigurable radar unit.

14. The analog and mixed signal baseband integrated circuit of claim 13 wherein the plurality of radar baseband programmable circuits comprises:
    a first selectable programmable circuit that includes at least one filter, at least one amplifier and at least one analog-to-digital converter configured for narrowband and/or high-linearity operation; and a second selectable programmable circuit that includes at least one filter, at least one amplifier and at least one analog-to-digital converter configured for wideband and/or low-linearity operation.

15. A method of operation for a reconfigurable radar unit that comprises a millimetre wave (mmW) transceiver (Tx/Rx) circuit configured to radiate a transmit radar signal and receive an echo signal thereof; a mixed analog and baseband integrated circuit; and a signal processor circuit; the method comprising:
configuring at least the mixed analog and baseband integrated circuit and signal processor circuit to support a plurality of radar operational modes;
monitoring a performance of the reconfigurable radar unit by a radar sensitivity monitor and architecture reconfiguration control unit; and
dynamically re-configuring at least a portion of at least one of the mixed analog and baseband integrated circuit and signal processor circuit to effect a change in the radar operational mode in response to the monitored radar performance, wherein the monitored radar performance includes a determination as to whether a vehicle in a vicinity to the radar sensitivity monitor and architecture reconfiguration control unit is using a same type of radar unit.

16. The method of claim 15 further comprising configuring the radar sensitivity monitor and architecture reconfiguration control unit to initiate switching more than two radar operational modes in a real-time manner.

17. The method of claim 15 further comprising configuring the radar sensitivity monitor and architecture reconfiguration control unit to activate/enable associated circuitry to support the selected radar operational mode.

18. The method of claim 15 further comprising configuring the reconfigurable radar unit to support more than two radar operational modes from a group of: frequency modulated continuous wave (FMCW), pulse mode continuous wave (PMCW), frequency shift keyed (FSK), ultra-wideband (UWB) impulse radar, Pulse Doppler radar, and quadrature radar signal processing.

19. The method of claim 15 further comprising controlling by the signal processor circuit or the radar sensitivity monitor and architecture reconfiguration control unit at least one switching circuit located between the mixed analog and baseband integrated circuit and the mmW Tx/Rx circuit to route a selected transmit radar signal to a first antenna in a transmit path and receive an echo signal from a second antenna in a receive path.

20. The method of claim 15 further comprising configuring the mmW Tx/Rx circuit of the reconfigurable radar unit to operate in a 77-81 GHz communication frequency range.

* * * * *